(12) United States Patent
Heim et al.

(10) Patent No.: US 6,879,471 B2
(45) Date of Patent: Apr. 12, 2005

(54) RECORDING HEAD DESIGN FOR IDENTIFYING READER-TO-PERMANENT MAGNET ISOLATION FAILURE

(75) Inventors: Kevin R. Heim, Eden Prairie, MN (US); Richard P. Larson, Brooklyn Park, MN (US); Daniel P. Burbank, Minneapolis, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 139 days.

(21) Appl. No.: 10/462,957

(22) Filed: Jun. 17, 2003

(65) Prior Publication Data

US 2004/0257715 A1 Dec. 23, 2004

(51) Int. Cl.[7] .................................................. G11B 5/39
(52) U.S. Cl. .................................. 360/319; 360/324.12
(58) Field of Search ................................. 360/313, 317, 360/319, 323, 324.1, 324.12

(56) References Cited

U.S. PATENT DOCUMENTS

| 5,254,941 | A | | 10/1993 | Osika ........................... 324/158 |
| 5,402,074 | A | | 3/1995 | Keel et al. ................... 324/551 |
| 5,508,614 | A | | 4/1996 | Garfunkel et al. ........... 324/318 |
| 5,557,492 | A | | 9/1996 | Gill et al. .................... 360/113 |
| 6,344,952 | B1 | * | 2/2002 | Biskeborn et al. ........... 360/319 |
| 6,473,279 | B2 | | 10/2002 | Smith et al. ............ 360/324.12 |
| 6,483,298 | B2 | | 11/2002 | Heim et al. .................. 324/210 |
| 6,754,051 | B2 | * | 6/2004 | Ishiwata ....................... 360/319 |
| 2001/0052773 | A1 | * | 12/2001 | Heim et al. .................. 324/210 |
| 2002/0015264 | A1 | | 2/2002 | Heim et al. .................. 360/313 |
| 2002/0080533 | A1 | * | 6/2002 | Ozue et al. .................. 360/313 |
| 2003/0016474 | A1 | * | 1/2003 | Biskeborn .................... 360/319 |
| 2003/0112563 | A1 | * | 6/2003 | Souda et al. ................. 360/323 |
| 2004/0057162 | A1 | * | 3/2004 | Gill ............................. 360/314 |

* cited by examiner

*Primary Examiner*—Jefferson Evans
(74) *Attorney, Agent, or Firm*—Westman, Champlin & Kelly

(57) ABSTRACT

A spin valve head configured to operate in a Current-In-Plane (CIP) mode is provided. The spin valve head has an air bearing surface (ABS) and a top and a bottom shield separated by a central region proximate the ABS. A sensor, positioned in the central region, has a proximal end and a distal end, with the proximal end forming a portion of the ABS. A permanent magnet is positioned in the central region and proximate the distal end of the sensor. The permanent magnet being separated from the sensor by a gap layer. The top shield, the bottom shield and the permanent magnet are electrically coupled together to allow for electrical testing of the spin valve head.

32 Claims, 9 Drawing Sheets

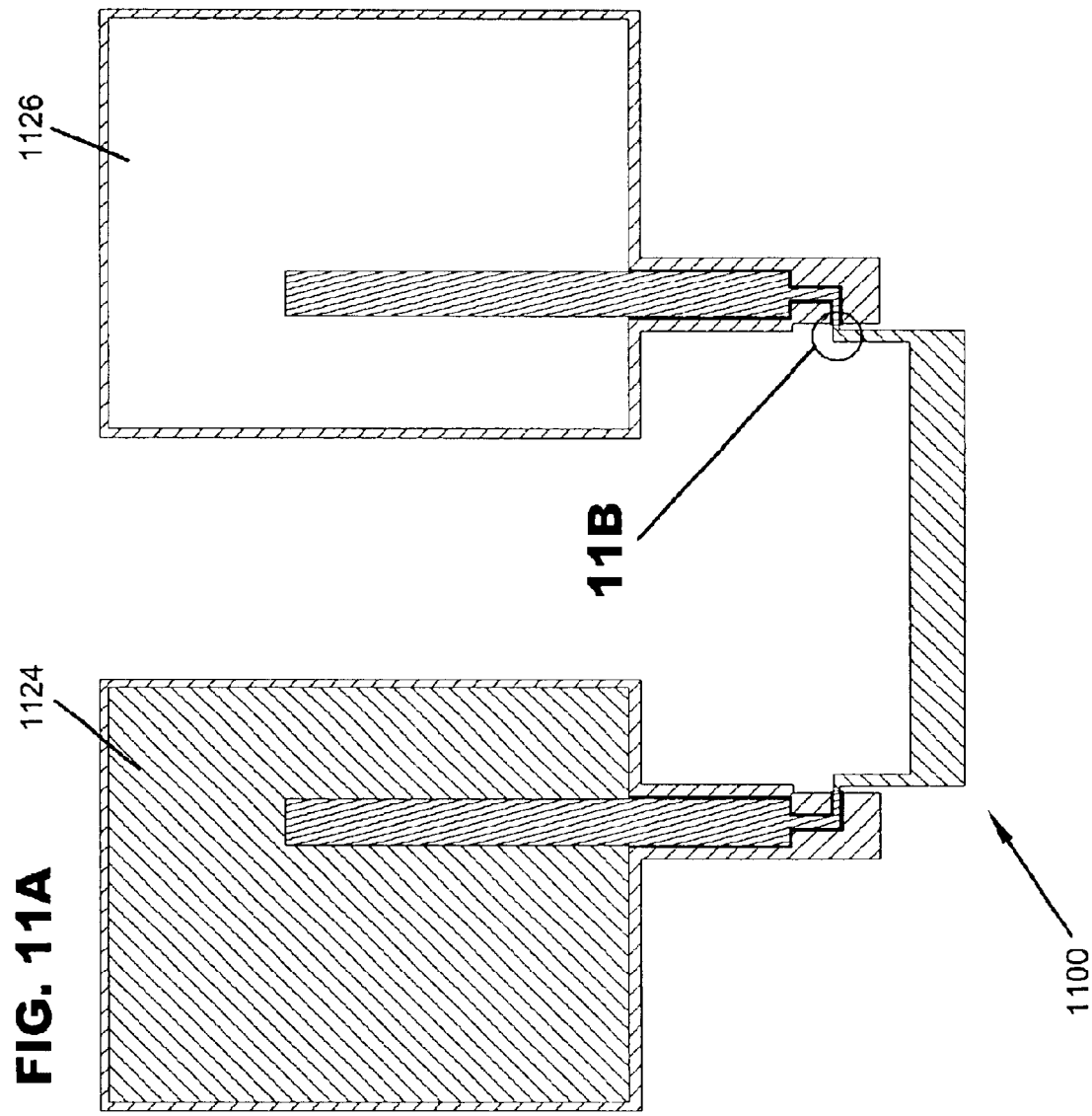

RECORDING HEAD DESIGN FOR IDENTIFYING READER-TO-PERMANENT MAGNET ISOLATION FAILURE

FIELD OF THE INVENTION

The present invention relates generally to magnetic data storage systems, and more particularly but not by limitation to methods and devices for determining the electrical integrity of recording heads used in such systems.

BACKGROUND OF THE INVENTION

Recording heads, such as magnetoresistive (MR) heads, are typically formed of various layers deposited upon a substrate. MR heads utilize a MR element or sensor positioned between a top shield (TS) and a bottom shield (BS) to read magnetically-encoded information from a magnetic medium, such as a disc, by detecting magnetic flux stored on the magnetic medium. The MR sensor has a proximal end and a distal end, with the proximal end of the MR sensor forming a portion of an air bearing surface (ABS) of the head. In one type of MR head, a sensing current for detecting magnetic bits of information passes in a plane of the MR read element. Such a MR head is referred to as a Current-In-Plane (CIP) Spinvalve transducer. A ferromagnetic stabilization scheme for traditional CIP Spinvalve transducers utilizes permanent magnets (PM), positioned proximate the ABS of the head on either side of the MR sensor, which essentially define the MR sensor's reader width. The transducer is operated by running an electrical current from one PM to the other after passing through the MR sensor.

A recently developed so-called CIP Trilayer Spinvalve transducer, however, places the stabilizing PM material behind the distal end of the MR sensor within the slider body, with the PM material being separated from the distal end of the MR sensor by a dielectric layer. Typically, the dielectric layer is thin enough to provide the proper amount of magneto-static coupling to the MR sensor for magnetic stabilization but thick enough to prevent electrical current from shunting through the PM material and thereby reducing the MR signal during read operations. The CIP Trilayer Spinvalve sensor defines its reader width with non-magnetic extended contacts (EC) and the sense current flows from one EC to the other after passing through the MR sensor.

This ferromagnetic stabilization scheme employed in the so-called CIP Trilayer Spinvalve transducer creates a risk of Reader-to-Permanent Magnet Isolation (RPM-Iso) failure. If RPM-Iso failure is present, then electrical current which ordinarily travels through the MR sensor for detecting magnetic bits of information on the recording medium can shunt through the PM material and reduce the MR response, thereby resulting in a defective transducer.

Traditional CIP Spinvalve transducers and CIP Trilayer Spinvalve transducers incorporate a shield-shunt connection which electrically connects the BS to the TS. The shield-shunt connection can be used for Reader-to-shield Isolation (RS-Iso) failure testing to detect defective transducers. However, as mentioned above, the ferromagnetic stabilization scheme employed in the CIP Trilayer Spinvalve transducer also creates a risk of RPM-Iso failure.

Thus, the need for a scheme for testing CIP Trilayer Spinvalve transducers for the presence or absence of proper RPM-Iso.

SUMMARY OF THE INVENTION

The present embodiments relate to recording heads used in magnetic data storage systems.

One embodiment is directed to a spinvalve head configured to operate in a Current-In-Plane (CIP) mode. The spinvalve head has an air bearing surface (ABS) and a top and a bottom shield separated by a central region proximate the ABS. A sensor, positioned in the central region, has a proximal end and a distal end, with the proximal end forming a portion of the ABS. A permanent magnet is positioned in the central region and proximate the distal end of the sensor. The permanent magnet being separated from the sensor by a gap layer. The top shield, the bottom shield and the permanent magnet are electrically coupled together to allow for electrical testing of the spinvalve head.

In another embodiment, the top and bottom shield of the spinvalve head are electrically coupled together but electrically isolated from the permanent magnet. In this embodiment, the sensor is configured to have a resistance value that allows for relatively accurate sensor-to-permanent-magnet-isolation electrical testing of the spinvalve head.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
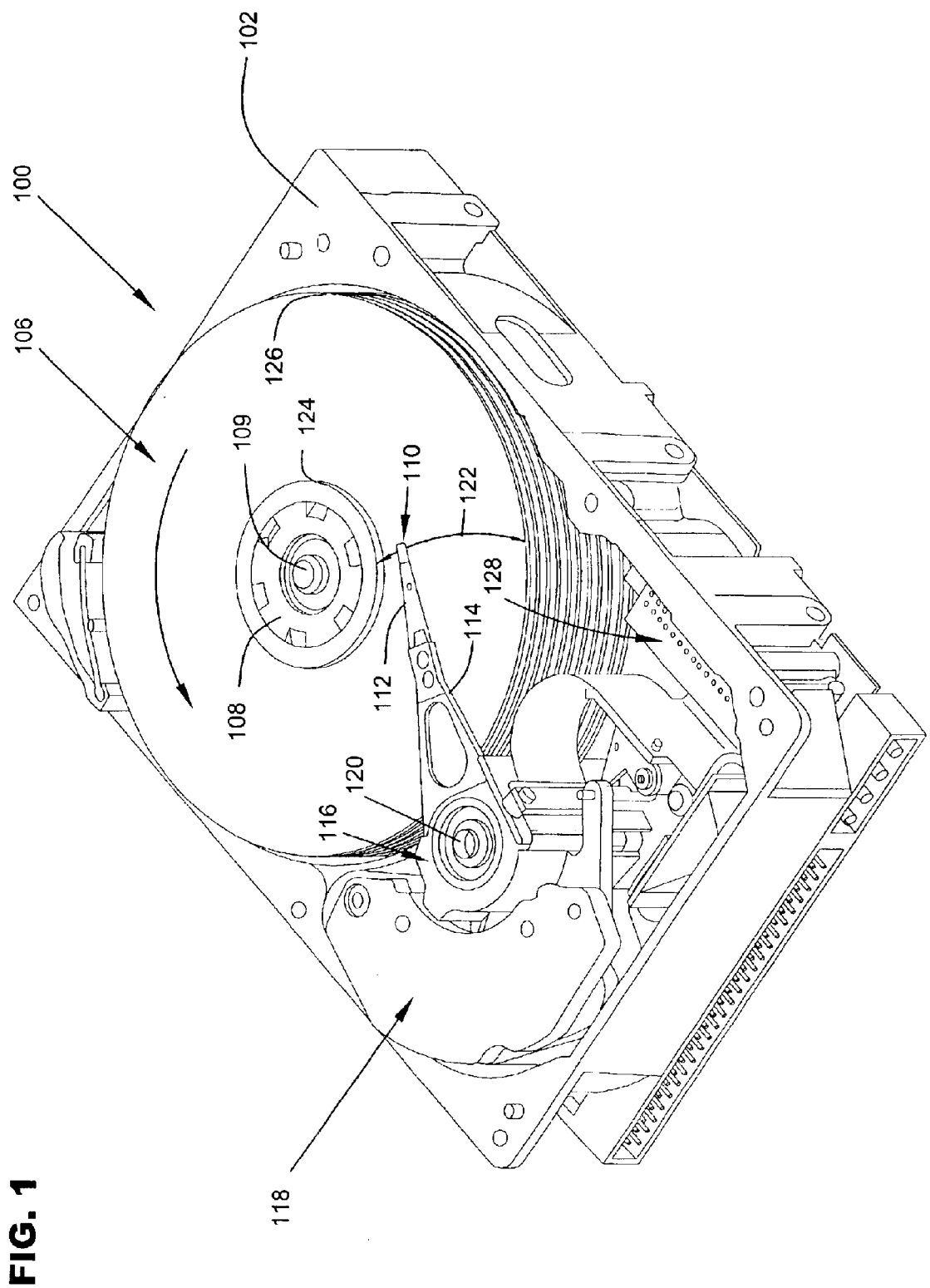
FIG. 1 is a perspective view of a disc drive.

FIG. 1 is a perspective view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109. Each disc surface has an associated disc head slider 110 which is mounted to disc drive 100 for communication with the disc surface. When discs 106 rotate, heads 110 fly above/below surfaces of discs 106 on thin films of air or liquid that carry heads 110 for communicating with the respective disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. VCM 118 rotates actuator 116 with its attached heads 110 about a pivot shaft 120 to position heads 110 over a desired data track along an arcuate path 122 between a disc inner diameter 124 and a disc outer diameter 126. VCM 118 is driven by servo electronics 128 based on signals generated by heads 110 and a host computer (not shown).

Heads 110 may be merged Current-In-Plane (CIP) Trilayer Spinvalve heads employed for recording information in multiple circular tracks on the respective disc surfaces as well as for reading information therefrom.

Figure 2:
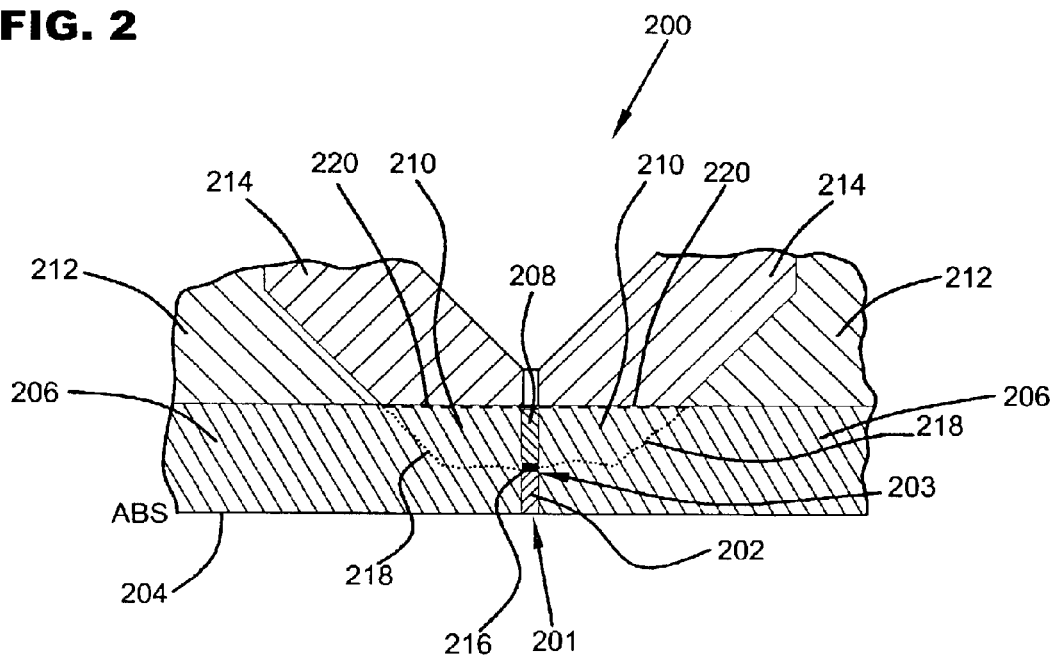
FIG. 2 is a schematic illustration showing various materials and geometry of a CIP Trilayer Spinvalve head.

FIG. 2 is a schematic illustration showing various materials and geometry of a CIP Trilayer Spinvalve head 200. Sensor 200 includes a magnetoresistive element (MRE) 202 having a proximal end 201 that forms a portion of an air bearing surface (ABS) 204 and a distal end 203 within the body of slider 200. On either side of, and in contact with, MRE 202 are unmilled electrical contacts (UM-EC) 206. As can be seen in FIG. 2, portions of UM-EC 206 form a part of ABS 204. Proximate the distal end of MRE 202, is a permanent magnet (PM) 208 which, as mentioned above, provides the necessary magnetic stabilization for MRE 202. Regions 210, which are on either side of PM 208, include unmilled PM (UM-PM), which is separated from milled EC (M-EC) by a dielectric. Also included in transducer 200, are milled EC (M-EC) regions 212 and regions 214 that include milled PM (M-PM), which is separated from M-EC by a dielectric. To electrically isolate PM 208 from MRE 202 and from the underlying EC material in regions 210 as well as 212 and 214, a thin layer of dielectric (not shown) is employed, which separates PM 208 from MRE 202 and also from EC material in regions 210, 212 and 214. However, for various reasons (such as insufficient thickness of the dielectric layer) the electrical isolation may not always be adequate. If the Reader-to-Permanent Magnetic Isolation (RPM-Iso) is inadequate, then electrical current which ordinarily travels through the MRE for detecting magnetic bits of information on the recording medium can shunt through the PM material and reduce the MR response, thereby resulting in a defective transducer. Various edges and areas around PM 208, within sensor 200, where electrical isolation failure can occur are identified in FIG. 2. Three edges are identified by a) solid line 216—MRE-to-PM Edge-Isolation, b) dotted line 218—EC-to-PM Edge-Isolation, and c) dashed line 220—milled EC-to-PM Edge Isolation corresponding to the respective RPM-Iso sub-groups. EC-to-PM Area-Isolation consists of the two regions bounded by the dotted and dashed lines, excluding PM region 208.

Under the present invention, a collection of transducer and test device designs for identifying the presence and type of RPM-Iso failure are provided. First, two basic designs (transducer configurations) and methods are described for detecting RPM-Iso failures on each and every transducer during the traditional wafer-level Reader-to-shield Isolation (RS-Iso) test. Additionally, to further diagnose the transducer-level failure mode, several wafer-level test device designs and methods are described for determining which particular RPM-Iso failure mode dominates a wafer suffering from RPM-Iso or RS-Iso failures.

Figure 3:
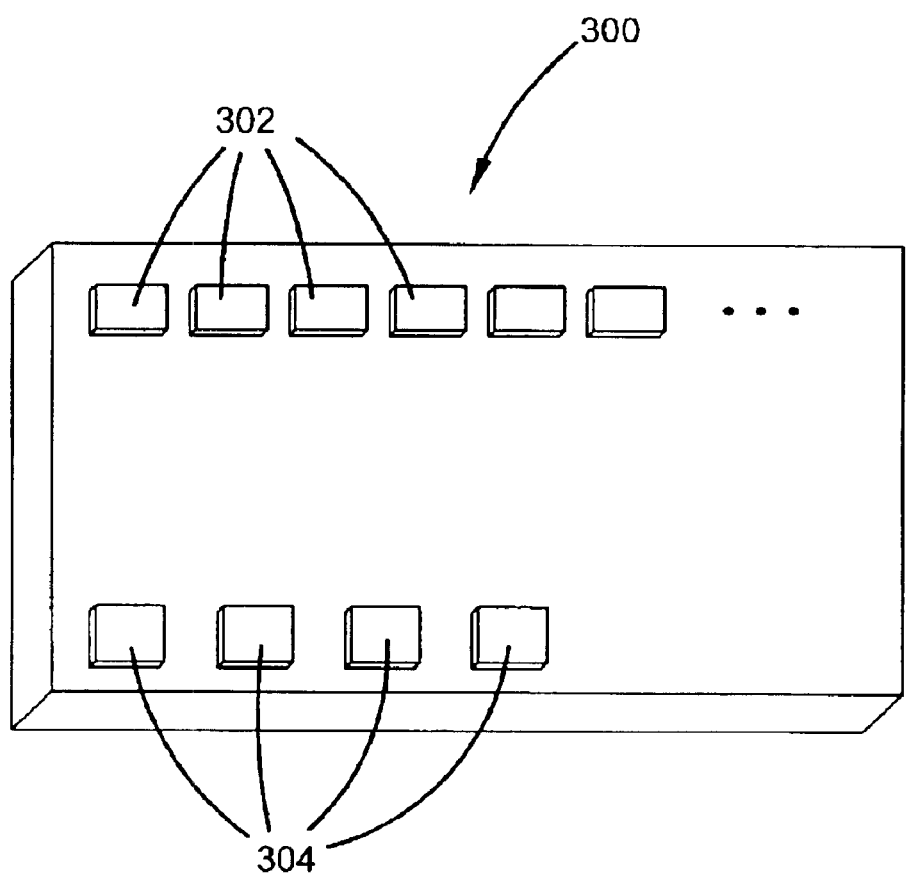
FIG. 3 is a simplified block diagram of a wafer including transducers and test devices of the present invention.

FIG. 3 is a simplified block diagram of a wafer 300 including transducers 302 and test devices 304 of the present invention. The number of transducers is substantially greater than the number of test devices on a wafer (such as 300). Transducers 302 can be used as read/write heads after testing. Generally, transducers 302 and test devices 304 of the present invention may be manufactured by processes known to those skilled in the art. Specific embodiments of transducers (such as 302) and test devices (such as 304) and shown in FIG. 4 and FIGS. 6–11 are described below.

Figure 4:
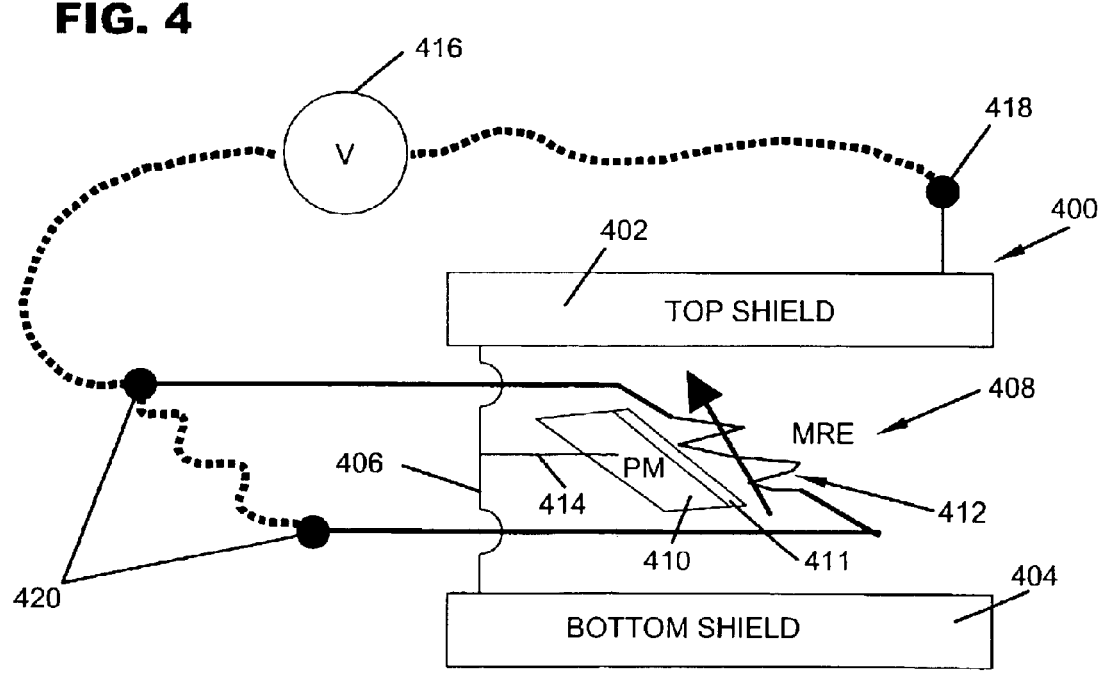
FIG. 4 is a simplified block diagram of a portion of a CIP Trilayer Spinvalve transducer in accordance with an embodiment of the present invention.

FIG. 4 is a simplified block diagram of a portion of a CIP Trilayer Spinvalve transducer in accordance with an embodiment of the present invention. FIG. 4 (as well as FIGS. 5 through 11) does not have all components of a head slider assembly depicted; parts that are unnecessary to explain the invention have not been included for the sake of clarity. Spinvalve 400 is a transducer (such as 302 (FIG. 3)) which is a part of a wafer (such as 300 (FIG. 3)) when it is electrically tested for RPM-Iso and RS-Iso. As in the case of a conventional CIP Trilayer Spinvalve transducer, CIP Trilayer Spinvalve 400 of the present invention includes a top shield (TS) 402 and a bottom shield (BS) 404, which are electrically connected by a shield-shunt 406, and also includes a central region 408, between TS 402 and BS 404, that includes PM 410 and MRE 412 separated by a gap layer 411. However, an additional electrical connection 414, that electrically couples PM 410 to shield-shunt 406, is included in CIP Trilayer Spinvalve 400 of the present invention to help carry out RPM-Iso testing of Spinvalve 400. Additional electrical connection 414 can be composed of either PM material or recessed contact (RC) material with no additional processing steps but with a simple change to one of the lithographic reticles. In fact, the traditional RS-Iso test, which includes applying a voltage between the reader shields and reader leads and checking for the presence or absence of a current flow, can remain unchanged both from a hardware and software point of view such that the test will automatically detect both RS-Iso and RPM-Iso failures. Thus, during the new combined RS-Iso and RPM-Iso test, henceforth referred to as cRS-Iso test, a voltage 416 is applied, as before, between the shields (at lead 418) and the reader leads 420. If an electrical short exists between the reader and the shields (RS-Iso failure) and/or between the reader and the permanent magnet (RPM-Iso failure) then a measurable current will flow and the transducer is considered defective for cRS-Iso failure.

One of the advantages of the CIP Trilayer Spinvalve design shown in FIG. 4 is the ability to simultaneously detect the presence of RS-Iso and RPM-Iso failures for each transducer. Further, this design requires no additional wafer processing, no additional probe hardware or software for defect testing and no additional probe test time. Finally, as few as one lithographic reticle change is required for incorporation into pre-existing CIP Trilayer Spinvalve designs.

A disadvantage of this design is the inability to distinguish RS-Iso failures from RPM-Iso failures, and therefore the exact failure cause is unknown. Further, the specific RPM-Iso failure mode cannot be identified with this test. However, these disadvantages are addressed by the inclusion of additional wafer-level test devices which are described further below in connection with FIGS. 10–11.

As mentioned above, FIG. 4 is only a simplified block diagram of a portion of a CIP Trilayer Spinvalve showing electrical connection 414 between PM 410 and shield-shunt 406. Specific methods by which electrical connection 414 can be made between the PM and the shield-shunt are described below in connection with FIGS. 6–9.

Figure 5:
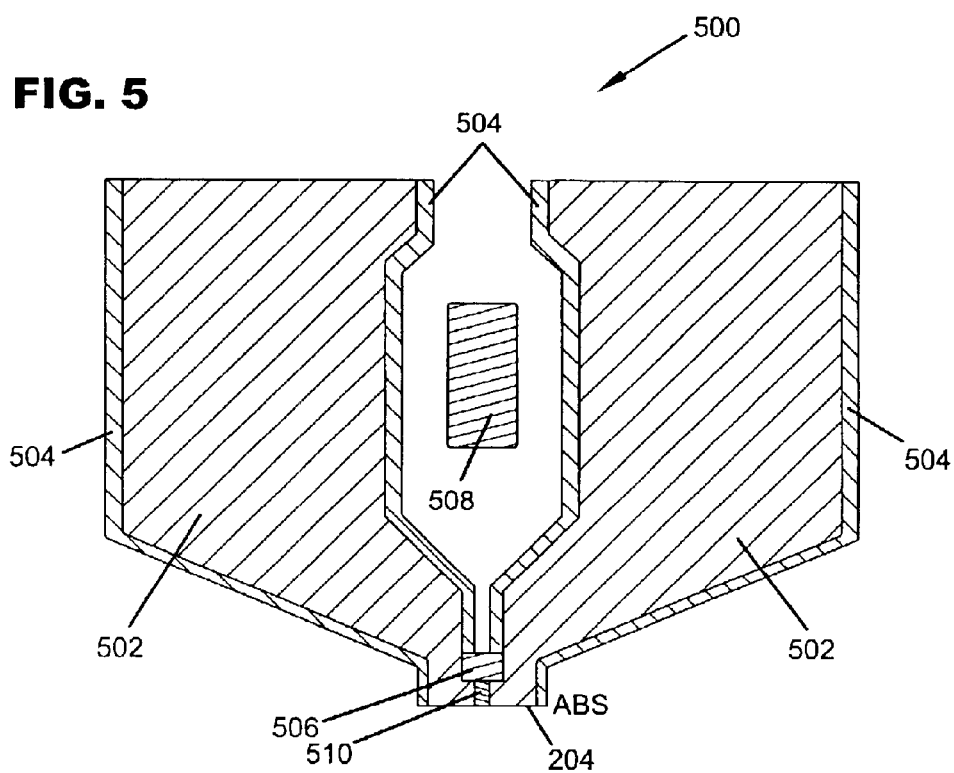
FIG. 5 is a schematic illustration of a conventional CIP Trilayer Spinvalve transducer.
Figure 6:
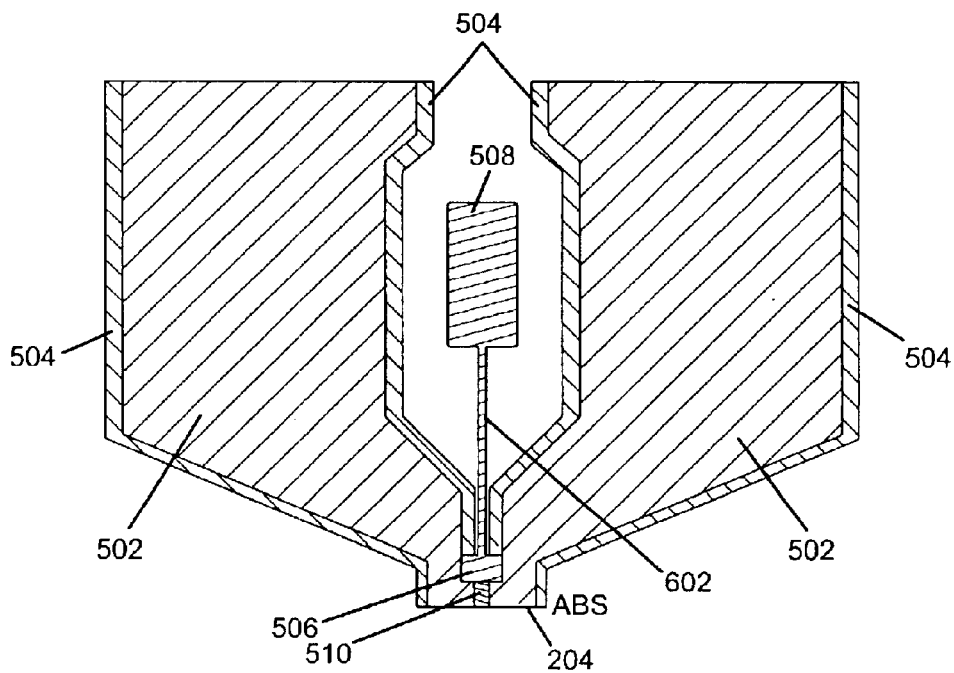
FIGS. 6–9 are schematic illustrations of CIP Trilayer Spinvalve transducers in accordance with embodiments of the present invention.

To better illustrate different methods by which electrical connection 414 can be made between the PM and the shield-shunt, a portion of a conventional CIP Trilayer Spinvalve transducer, with no capabilities for determining if RPM-Iso failure exists for the transducer, is shown in FIG. 5. The same reference numerals are used to represent the same or similar elements in FIGS. 5–9. In FIG. 5, which is a schematic illustration of a conventional CIP Trilayer Spinvalve transducer 500, UM-EC regions are represented by reference numeral 502, M-EC regions are represented by reference numeral 504 and the PM region is represented by reference numeral 506. Vertical rectangle 508 is the shield-shunt connection for electrically joining the BS and TS (not shown in FIG. 5). MRE 510 is located below PM 506.

Figure 7:
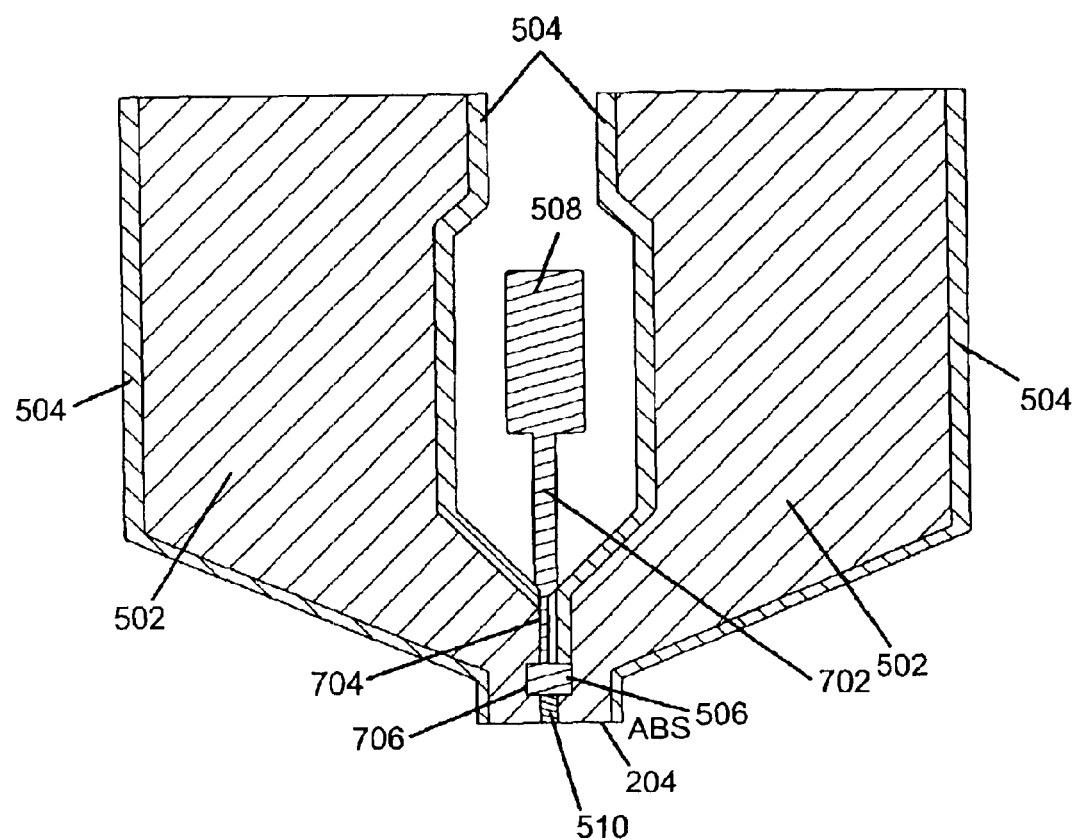
Figure 8:
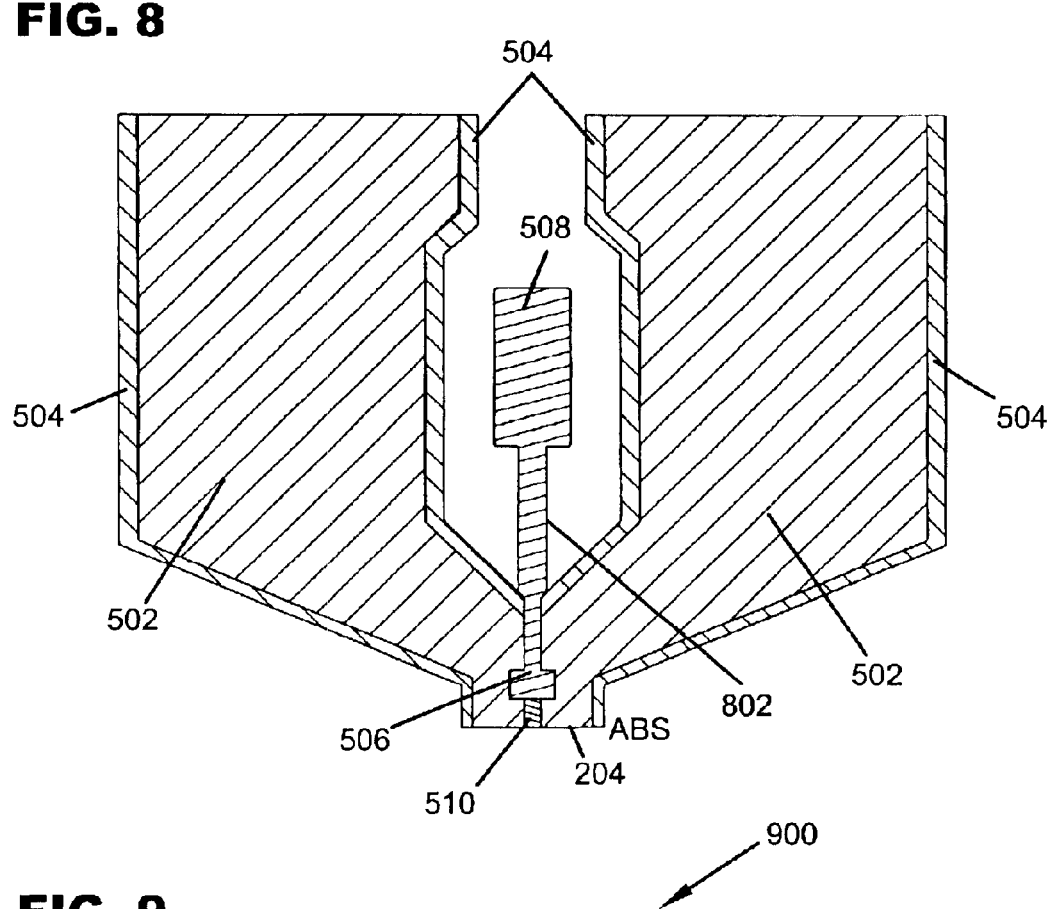

In theory, the simplest method (shown in FIG. 6) of designing an electrical connection between PM 506 and shield-shunt 508 would be to alter the PM-mill reticle so that a narrow PM conductor 602 connects the two objects. In practice, however, two trenches (resulting from the removal patterning of the PM) formed on either side of narrow PM conductor 602 may result in increased re-deposition material when milling the PM such that its design may create an unwanted RPM-Iso failure event. If the trenches are sufficiently wide then this design can be effectively utilized, but if the trenches are narrow then the following designs, illustrated in FIGS. 7 and 8, are preferred. In the design shown in FIG. 7, narrow PM conductor 702 is first made to meet the transducer's left EC edge 704 and then its left PM edge 706. The benefit of this design is a wider trench which prevents PM re-deposition (and RPM-Iso failure) while the risk is an increased EC-to-PM Area-Isolation and Edge-Isolation. In general, the risk of EC-to-PM Area-Isolation is small as evidenced by recent, extremely thin alumina studies with significantly larger areas isolated by a thin alumina dielectric. The (achievable) purpose of this design is to simply identify an isolation failure without itself introducing the failure. FIG. 8, in contrast, creates no trench by retaining all of the PM material (represented by reference numeral 802) within the yoke. The benefit of this design is to prevent all possible re-deposition by eliminating the trench altogether and is therefore far less susceptible to milled EC-to-PM Edge-Isolation failure as the design shown in FIG. 7. Although of low risk, this design (shown in FIG. 8) has roughly twice the risk of EC-to-PM Area-Isolation failure as the previous design (shown in FIG. 7).

Instead of electrically coupling the shield-shunt to the PM (as shown in FIG. 4 and FIGS. 6–8), an alternative design which is more sensitive to multiple-event isolation failures is to simply reduce the on-wafer MR sensor stripe height (SH). Traditional CIP Spinvalve sensors have large on-wafer SH values, but if the height of the MR sensor is reduced so that its resistance to a current flow is comparable the resistance to current flow through the PM, then a noticeable reduction in on-wafer sensor resistance will result if electrical isolation fails between the MR sensor and the PM. For example, if the height of the PM is 0.3 micrometers ($\mu$m) and its sheet resistance is 20 Ohms/square then this equates to a 6.7 Ohm resistance for a 0.1 $\mu$m effective reader width. In comparison, by making the on-wafer MR sensor's SH 0.7 $\mu$m and sheet resistance of 30 Ohms/square results in a resistance of 4.3 Ohms for the same 0.1 $\mu$m reader width. If RPM shorting is not present, then the MR sensor's resistance is 4.3 Ohms because none of the current passes through the PM. If RPM shorting is present, then the effective parallel path resistance is 2.6 Ohms, or a drop of 40%. In reality, there is lead resistance to include on most transducer designs such that a resistance drop of 20% is expected if RPM shorting were to occur.

Figure 9:
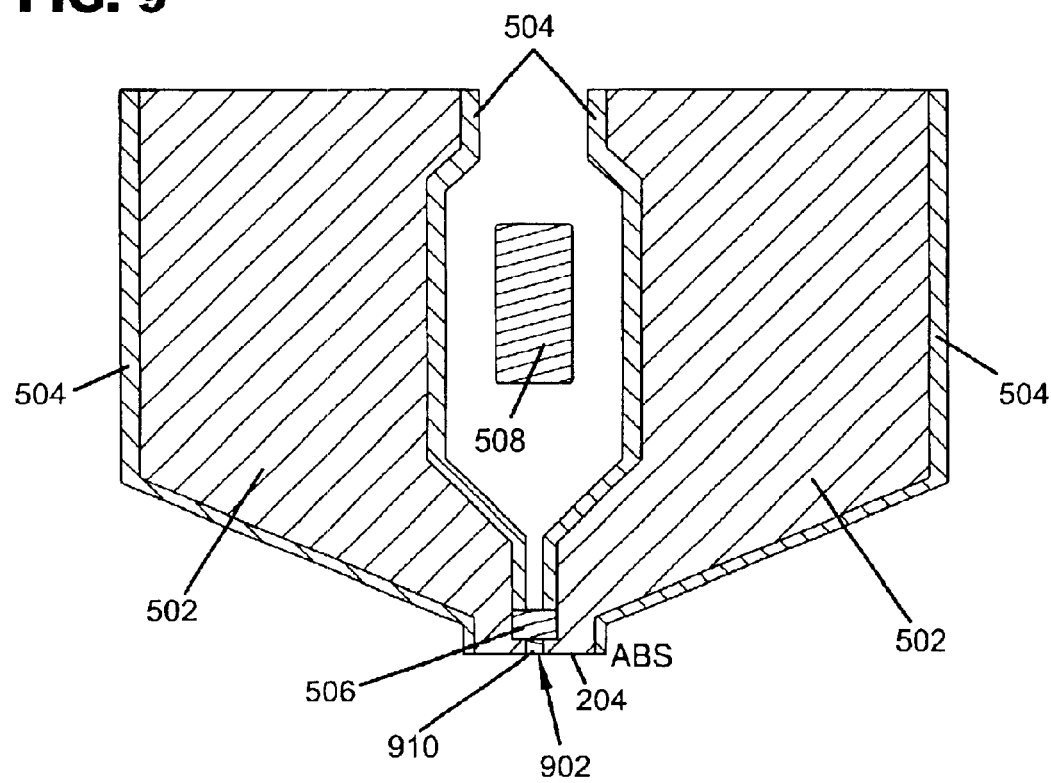

FIG. 9 is a schematic illustration of a CIP Trilayer Spinvalve transducer 900 having a reduced stripe height (SH) in accordance with an embodiment of the present invention. In comparison to FIGS. 5–8, the magneto-resistive element region is substantially smaller. By simply repositioning the PM-mill reticle height at MRE 902, a smaller on-wafer SH is created. The risk of increased electro-static discharge (ESD) damage due to the smaller SH does not appear to be an issue with recent advances in on-wafer ESD protection. A conventional rough lapping process need not be adjusted for this new CIP Trilayer Spinvalve design. A fine lapping process is carried out after the small on-wafer SH has been breached during rough lapping.

As mentioned earlier, a cRS-Iso test of each transducer cannot distinguish whether the test failed due to RS-Iso, RPM-Iso, or which particular sub-group failure has occurred, hence the need for test devices which are specially designed to identify the root cause of failure. The test devices described below allow for distinguishing the actual RPM-Iso failure mode. Four potential RPM-Iso sub-group failure modes are presented and addressed below:

1) MRE-to-PM Edge-Isolation

In this case, a two-terminal device is created where one lead composed of MR material (similar to the MRE) abuts a second lead composed of PM material. The natural process flow of creating the transducer creates a thin dielectric separation layer between the MR and PM materials.

It is, however, difficult in practice to photo-pattern the MR material with the same dimension as the transducer's reader width. Because of this lithographic difficulty, the MR-PM edge length is optionally increased at the risk of creating an overly sensitive MRE-to-PM Edge-Isolation device. In other words, if the test device does not fail, then the transducer, with its smaller edge length, is also unlikely to fail. However, depending on the sensitivity factor, the test device may indicate a problem which is not present on the actual transducer. This minor issue can be solved with the use of smaller on-wafer stripe heights.

A simple leakage current test between the two terminals held at a fixed voltage can be used to obtain the MRE-to-PM Edge-isolation resistance. In most cases the resistance will measure to be very large (~$10^{21}$ Ohms) and quickly fall to zero when isolation failure is present. If the majority of transducers on a given wafer fail for cRS-Iso but pass all sub-group RS-Iso and sub-group RPM-Iso tests, except this one, then it is clear that the sub-group MRE-to-PM Edge-Isolation is present.

Figure 10A:
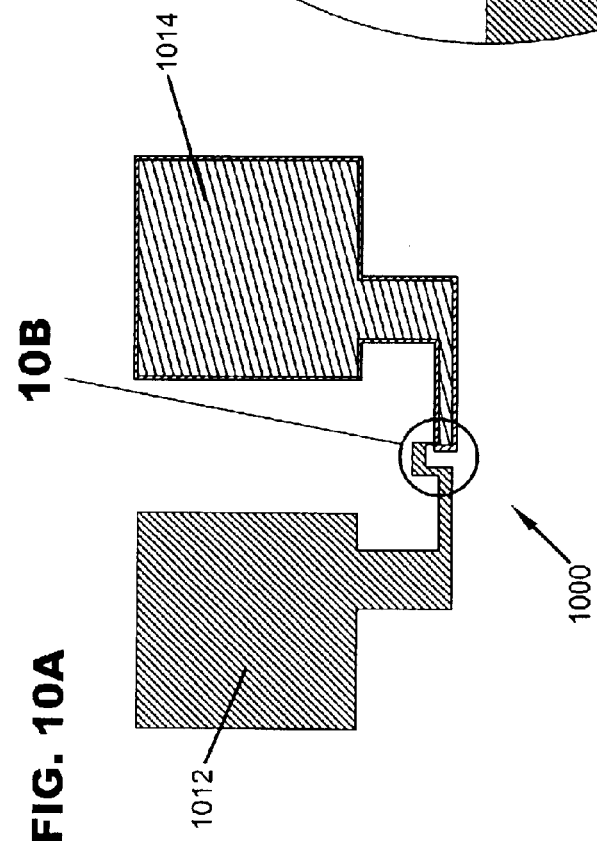
FIGS. 10A–11C are schematic illustrations of test devices in accordance with embodiments of the present invention.
Figure 10B:
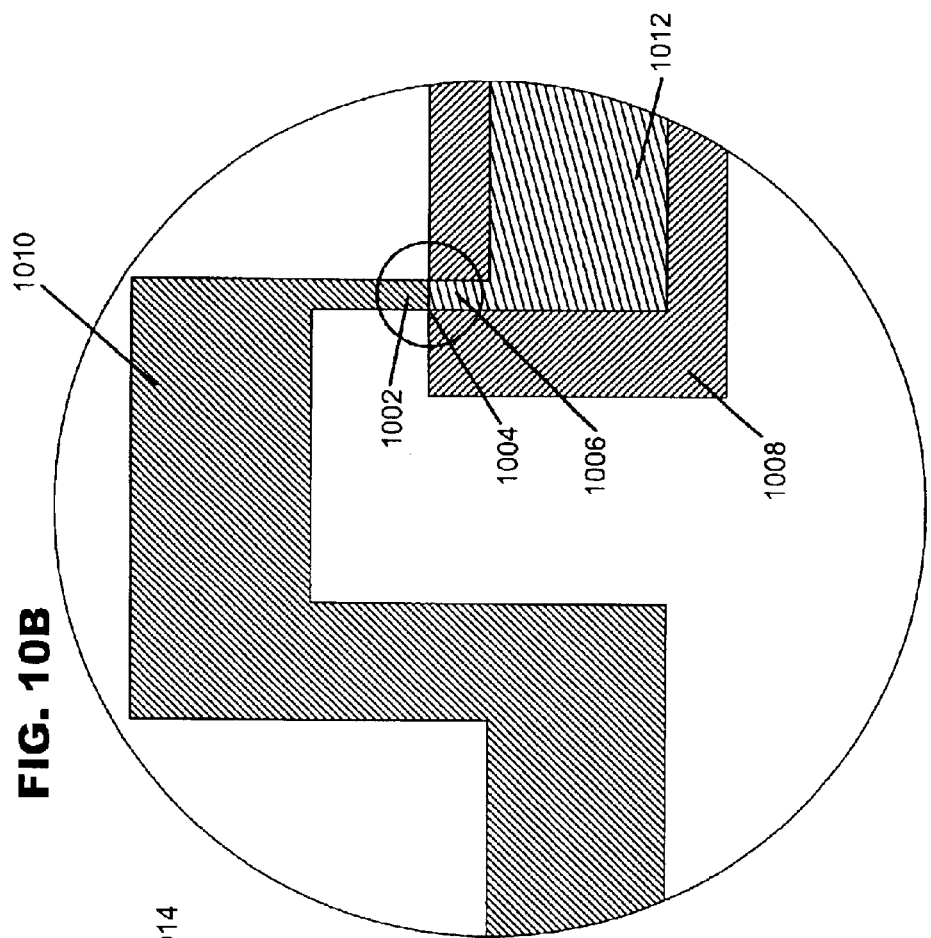

FIG. 10 is a schematic illustration of a two-terminal device 1000 where MR material 1006 abuts a thin layer of dielectric 1004 which in turn abuts PM material 1002. Device 1000 is fabricated by first depositing the MR layers, then using the SH-mill reticle to define the eventual placement of the PM material. The exposed photo resist allows the mill to remove the unprotected MR material. Following the mill, there is a thin deposition of dielectric and a subsequent PM deposition. The PM-mill reticle then protects the PM and a MR lead which connects to the opposing terminal. In FIG. 10, region 1008 is an area where MR material had been protected by photo-resist during the stripe height formation process but the MR material was later milled away after processing with the PM-mill reticle. Regions 1010 and 1012 represent areas which are protected during the PM mill operation to create the two terminal device with an intervening dielectric layer 1004. As mentioned above, a simple leakage current test between terminals 1012 and 1014 held at a fixed voltage can be used to obtain the MRE-to-PM Edge-isolation resistance.

2) EC-to-PM Edge-Isolation

In this case, a two-terminal device is created where one lead composed of EC material abuts a second lead composed of PM material. The natural process flow of creating the transducer creates a thin dielectric separation layer between the EC and PM materials. Edge length can be easily matched to that of the actual transducer such that the sensitivity of this device is comparable to the transducer. In some cases, however, a "canary in the coal mine" approach is warranted such that the test device is created with a larger-than-normal edge length to be an early warning device of potential risk to the transducers. A similar leakage test to that described above is made to determine if EC-to-PM Edge-Isolation is present.

In practice, however, a simple EC-PM edge cannot be formed without simultaneously creating an EC-PM overlap region as well. This confounds the sub-group isolation failure but fortunately an EC-to-PM Area-Isolation device can be constructed without an edge to further determine the root cause failure mode. It is important to realize that both failure modes are not equally probably but are more of a function of processing conditions. The EC-PM Edge-Iso has a smaller cross-section than the EC-PM Area-Iso thereby placing the Area-Iso at higher risk but, due to step coverage along the edge, this simultaneously places the Edge-Iso at higher risk. The best method of distinguishing the two sub-group isolation failure modes is to have a test device which allows for the separation of the sub-groups. An example EC-to-PM Edge-Isolation device is described further below in connection with FIG. 11.

3) EC-to-PM Area-Isolation

In this case, a two-terminal device is created where one lead composed of EC material lies beneath a second, larger lead composed of PM material. The natural process flow of creating the transducer creates a thin dielectric separation layer between the EC and PM materials. The overlap area can be easily matched to that of the actual transducer such that the sensitivity of this device is comparable to the transducer. In some cases, however, a "canary in the coal mine" approach is warranted such that the test device is created with a larger-than-normal area to be an early warning device of potential risk to the transducers. A similar leakage test to that described above is made to determine if EC-to-PM Area-Isolation is present. An example EC-to-PM Area-Isolation device is described further below in connection with FIG. 11.

4) Milled EC-to-PM Edge-Isolation

This sub-group failure mode is a result of re-deposition material creating a short between the milled EC and the PM during the PM mill operation. Typically, only 5 to 10 nanometers of dielectric separates the EC and the PM, and the natural wafer-build requires a step where an ion mill is used to remove nearly all of the PM material on the wafer except for the back of the MRE within the slider body (region 208 and 210 of FIG. 2). While mill end-pointing (point of detection of a change in material during removal (milling, ion etching, etc.) of wafer layers) is very accurate, it is conceivable that the mill action will result in some transducers with re-deposition material bridging across the thin dielectric layer thus providing a potentially defective transducer where the transducer sense current is allowed to bypass the MRE and pass instead through the PM.

In this case, a two-terminal device is created where one lead composed of EC material lies beneath a second, smaller lead, composed of PM material to create a potential re-deposition edge. The natural process flow of creating the transducer creates a thin dielectric separation layer between the EC and PM materials. Edge length can be easily matched to that of the actual transducer such that the sensitivity of this device is comparable to the transducer. In some cases, however, a "canary in the coal mine" approach is warranted such that the test device is created with a larger-than-normal edge length to be an early warning device of potential risk to the transducers. A similar leakage test to that described above is made to determine if milled EC-to-PM Edge-Isolation is present.

In practice, however, a simple milled EC-PM edge cannot be formed without simultaneously creating an EC-PM overlap region as well. This confounds the sub-group isolation failure but fortunately an EC-to-PM Area-Isolation device can be constructed without an edge to further determine the root cause failure mode. It is important to realize that both failure modes are not equally probably but are more of a function of processing conditions. The milled EC-PM Edge-Iso has a smaller cross-section than the EC-PM Area-Iso thereby putting the Area-Iso at higher risk but, due to mill conditions and step coverage along the edge, this simultaneously puts the Edge-Iso at higher risk. The best method of distinguishing the two sub-group isolation failure modes is to have a test device which allows for the separation of the sub-groups. An example milled EC-to-PM Edge-Isolation device is described below in connection with FIG. 11.

Figure 11C:
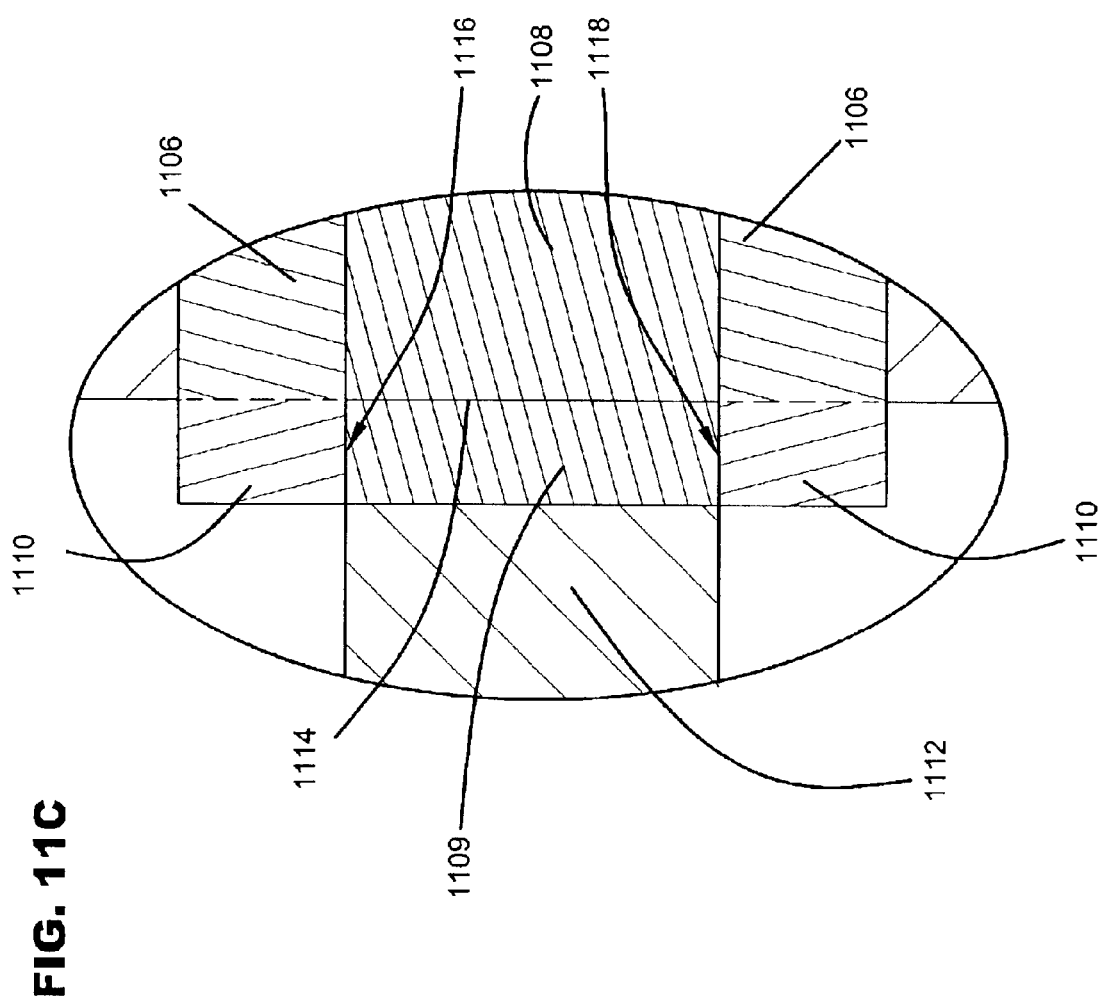
Figure 11B:
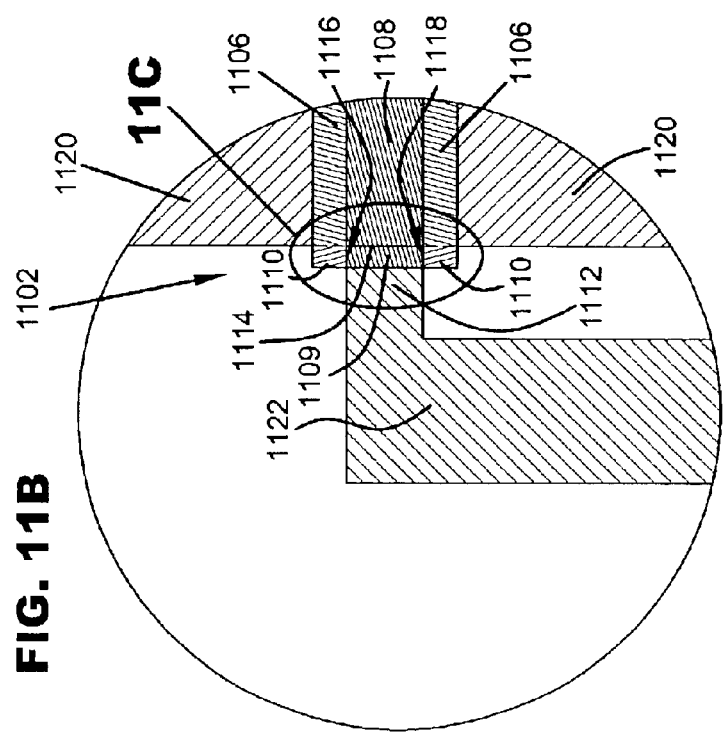

FIG. 11 is a schematic illustration of an example test device 1100 capable of simultaneously detecting any of the three EC-PM isolation failure modes. However, this particular design does not distinguish which of the three failure modes is present. To do this, one must use additional devices, thus requiring more space on the wafer, to further identify the particular EC-PM Isolation failure mode. Device 1100 is constructed by first depositing the MR material and creating two EC edges similar to that of an actual transducer's reader width using the EC-reticle and a photo-resist lift-off process. Secondly, the SH-mill reticle is used to mill away MR material as well as some of the EC material followed by a dielectric and self aligned PM deposition to create an EC-PM edge and an EC-PM area. Finally, the PM-reticle is used to preserve specific regions of PM material during the PM mill operation and since the PM object is smaller in size than the EC object there is formed a milled EC-PM edge. The respective edges and area are adjusted to match that of the transducer (such as 302 (FIG. 3)) to result in equivalent sensitivity to RPM-Iso failure or, the edges and area are exaggerated to create a device which is an early warning signal and is much more prone to RPM-Iso failures than an actual transducer. A high magnification view of the EC-PM isolation regions is shown in FIG. 11B and FIG. 11C is an enlarged view of the elliptical region in FIG. 11B. Device 1100 includes UM-EC regions 1108, region 1109 that includes PM on dielectric on M-EC in an overlapping relationship, M-EC regions 1106, M-PM-M-EC Edge Isolation regions 1110 and PM region 1112. EC-PM Edge-Iso is vertical edge 1114, EC-PM Area-Iso is the overlap in region 1109 and M-EC-PM Edge Iso are two horizontal edges 1116 and 1118. Regions 1120 represent areas where MR material is removed and region 1122 represents an area that is protected during the PM mill operation. Electrical tests are carried out by applying a voltage between terminals 1124 and 1126 and testing for a flow of leakage current through the device.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the recording head while maintaining substantially the same functionality without departing from the scope and spirit of the present invention. In addition, although the preferred embodiment described herein is directed to a recording head design for identifying reader-to-permanent magnet isolation failure for a disc storage system, it will be appreciated by those skilled in the art that the teachings of the present invention can be applied to any type of storage system or device that senses and/or writes magnetically, without departing from the scope and spirit of the present invention. The terms reader and sensor, used in the above description, both refer to the magnetoresistive read element. Although one of the above embodiments of the present invention involves reducing the height of the MR sensor to adjust its resistance, in general, any dimension(s) of the MR sensor may be adjusted to obtain a desired resistance without departing from the scope and spirit of the present invention.

What is claimed is:

1. A spinvalve head configured to operate in a current-in-plane (CIP) mode, the spinvalve head having an air bearing surface (ABS), the spinvalve head comprising:
    a top shield and a bottom shield separated by a central region proximate the ABS;
    a sensor, positioned in the central region, having a proximal end and a distal end, the proximal end forming a portion of the ABS; and
    a permanent magnet positioned in the central region and proximate the distal end of the sensor, the permanent magnet being separated from the sensor by a gap layer;
    wherein the top shield, the bottom shield and the permanent magnet are electrically coupled together to allow for electrical testing of the spinvalve head.

2. A wafer including the spin valve head of claim 1, the wafer further comprising a sensor-to-permanent-magnet-edge-isolation-device, the device comprising:
    a first lead formed of a material substantially similar to a material from which the sensor is formed; and
    a second lead formed of a material substantially similar to a material from which the permanent magnet is formed, the second lead being separated from the first lead by a dielectric separation layer;
    wherein the first lead, the second lead and the dielectric separation layer form an isolation region that is substantially similar to a sensor-to-permanent-magnet-edge-isolation-region formed by the sensor and the permanent magnet separated by the gap layer, and wherein the first and second leads can be employed to conduct electrical tests that produce results that are indicative of the presence or absence of electrical isolation between the sensor and the permanent magnet in the sensor-to-permanent-magnet-edge-isolation-region.

3. The spinvalve head of claim 1 further comprising a first electrical contact and a second electrical contact, wherein the first electrical contact and the second electrical contact are electrically coupled to the sensor such that an electrical current can flow from the first electrical contact to the second electrical contact via the sensor, and wherein the first electrical contact and the second electrical contact are separated from the permanent magnet by a dielectric.

4. A wafer including the spin valve head of claim 3, the wafer further comprising an electrical-contact-to-permanent-magnet-edge-isolation-device, the device comprising:
    a first lead formed of a material substantially similar to a material from which the first electrical contact and the second electrical contact is formed; and
    a second lead formed of a material substantially similar to a material from which the permanent magnet is formed, the second lead being separated from the first lead by a dielectric separation layer;
    wherein the first lead, the second lead and the dielectric separation layer form an isolation region that is substantially similar to electrical-contact-to-permanent-magnet-edge-isolation-regions formed by the first electrical contact and the second electrical contact separated from the permanent magnet by the dielectric, and wherein the first and second leads can be employed to conduct electrical tests that produce results that are indicative of the presence or absence of electrical isolation between the first electrical contact and the second electrical contact and the permanent magnet in the electrical-contact-to-permanent-magnet-edge-isolation-regions.

5. A wafer including the spin valve head of claim 3, the wafer further comprising an electrical-contact-to-permanent-magnet-area-isolation-device, the device comprising:
    a first lead formed of a material substantially similar to a material from which the first electrical contact and the second electrical contact is formed; and
    a second lead formed of a material substantially similar to a material from which the permanent magnet is formed, the second lead being separated from the first lead by a dielectric separation layer;
    wherein the first lead, the second lead and the dielectric separation layer form an isolation region that is substantially similar to electrical-contact-to-permanent-magnet-area-isolation-regions formed by the first electrical contact and the second electrical contact separated from the permanent magnet by the dielectric, and wherein the first and second leads can be employed to conduct electrical tests that produce results that are indicative of the presence or absence of electrical isolation between the first electrical contact and the second electrical contact and the permanent magnet in the electrical-contact-to-permanent-magnet-area-isolation-regions.

6. The spinvalve head of claim 5 wherein the second lead is larger than the first lead.

7. A wafer including the spin valve head of claim 3, the wafer further comprising a milled-electrical-contact-to-permanent-magnet-edge-isolation-device, the device comprising:
    a first lead formed of a material substantially similar to a material from which the first electrical contact and the second electrical contact is formed; and
    a second lead formed of a material substantially similar to a material from which the permanent magnet is formed, the second lead being separated from the first lead by a dielectric separation layer;
    wherein the first lead, the second lead and the dielectric separation layer form an isolation region that is substantially similar to milled-electrical-contact-to-permanent-magnet-edge-isolation-regions formed by the first electrical contact and the second electrical contact separated from the permanent magnet by the dielectric, and wherein the first and second leads can be employed to conduct electrical tests that produce results that are indicative of the presence or absence of electrical isolation between the first electrical contact and the second electrical contact and the permanent magnet in the milled-electrical-contact-to-permanent-magnet-edge-isolation-regions.

8. The spin valve head of claim 7 wherein the second lead is smaller than the first lead.

9. A spinvalve head configured to operate in a current-in-plane (CIP) mode, the spinvalve head having an air bearing surface (ABS), the spinvalve head comprising:
    a top shield and a bottom shield separated by a central region proximate the ABS;

a sensor, positioned in the central region, having a proximal end and a distal end, the proximal end forming a portion of the ABS; and a permanent magnet positioned in the central region and proximate the distal end of the sensor, the permanent magnet being separated from the sensor by a gap layer;

wherein the sensor is configured to have a resistance value that allows for relatively accurate sensor-to-permanent-magnet-isolation electrical testing of the spinvalve head.

10. A wafer including the spin valve head of claim 9, the wafer further comprising a sensor-to-permanent-magnet-edge-isolation-device, the device comprising:

a first lead formed of a material substantially similar to a material from which the sensor is formed; and a second lead formed of a material substantially similar to a material from which the permanent magnet is formed, the second lead being separated from the first lead by a dielectric separation layer;

wherein the first lead, the second lead and the dielectric separation layer form an isolation region that is substantially similar to a sensor-to-permanent-magnet-edge-isolation-region formed by the sensor and the permanent magnet separated by the gap layer, and wherein the first and second leads can be employed to conduct electrical tests that produce results that are indicative of the presence or absence of electrical isolation between the sensor and the permanent magnet in the sensor-to-permanent-magnet-edge-isolation-region.

11. The spinvalve head of claim 9 further comprising a first electrical contact and a second electrical contact, wherein the first electrical contact and the second electrical contact are electrically coupled to the sensor such that an electrical current can flow from the first electrical contact to the second electrical contact via the sensor, and wherein the first electrical contact and the second electrical contact are separated from the permanent magnet by a dielectric.

12. A wafer including the spin valve head of claim 11, the wafer further comprising an electrical-contact-to-permanent-magnet-edge-isolation-device, the device comprising:

a first lead formed of a material substantially similar to a material from which the first electrical contact and the second electrical contact is formed; and a second lead formed of a material substantially similar to a material from which the permanent magnet is formed, the second lead being separated from the first lead by a dielectric separation layer;

wherein the first lead, the second lead and the dielectric separation layer form an isolation region that is substantially similar to electrical-contact-to-permanent-magnet-edge-isolation-regions formed by the first electrical contact and the second electrical contact separated from the permanent magnet by the dielectric, and wherein the first and second leads can be employed to conduct electrical tests that produce results that are indicative of the presence or absence of electrical isolation between the first electrical contact and the second electrical contact and the permanent magnet in the electrical-contact-to-permanent-magnet-edge-isolation-regions.

13. A wafer including the spin valve head of claim 11, the wafer further comprising an electrical-contact-to-permanent-magnet-area-isolation-device, the device comprising:

a first lead formed of a material substantially similar to a material from which the first electrical contact and the second electrical contact is formed; and a second lead formed of a material substantially similar to a material from which the permanent magnet is formed, the second lead being separated from the first lead by a dielectric separation layer;

wherein the first lead, the second lead and the dielectric separation layer form an isolation region that is substantially similar to electrical-contact-to-permanent-magnet-area-isolation-regions formed by the first electrical contact and the second electrical contact separated from the permanent magnet by the dielectric, and wherein the first and second leads can be employed to conduct electrical tests that produce results that are indicative of the presence or absence of electrical isolation between the first electrical contact and the second electrical contact and the permanent magnet in the electrical-contact-to-permanent-magnet-area-isolation-regions.

14. The spinvalve head of claim 13 wherein the second lead is larger than the first lead.

15. A wafer including the spin valve head of claim 11, the wafer further comprising a milled-electrical-contact-to-permanent-magnet-edge-isolation-device, the device comprising:

a first lead formed of a material substantially similar to a material from which the first electrical contact and the second electrical contact is formed; and a second lead formed of a material substantially similar to a material from which the permanent magnet is formed, the second lead being separated from the first lead by a dielectric separation layer;

wherein the first lead, the second lead and the dielectric separation layer form an isolation region that is substantially similar to milled-electrical-contact-to-permanent-magnet-edge-isolation-regions formed by the first electrical contact and the second electrical contact separated from the permanent magnet by the dielectric, and wherein the first and second leads can be employed to conduct electrical tests that produce results that are indicative of the presence or absence of electrical isolation between the first electrical contact and the second electrical contact and the permanent magnet in the milled-electrical-contact-to-permanent-magnet-edge-isolation-regions.

16. The spin valve head of claim 15 wherein the second lead is smaller than the first lead.

17. A method of configuring a spinvalve head to allow for electrical testing of the spinvalve head, the spinvalve head adapted to operate in a current-in-plane (CIP) mode, the spinvalve head having an air bearing surface (ABS), the spinvalve head comprising a top shield and a bottom shield separated by a central region proximate the ABS, a sensor, positioned in the central region, having a proximal end and a distal end, the proximal end forming a portion of the ABS, and a permanent magnet positioned in the central region and proximate the distal end of the sensor, the permanent magnet being separated from the sensor by a gap layer, the method comprising:

forming a shield-shunt between the top shield and the bottom shield; and electrically coupling the permanent magnet to the shield-shunt.

18. The method of claim 17 further comprising forming, on a wafer comprising the spinvalve head formed by the method of claim 17:

a first lead of a material substantially similar to a material from which the sensor is formed; and a second lead of a material substantially similar to a material from which the permanent magnet is formed, the second lead being separated from the first lead by a dielectric separation layer;

wherein the first lead, the second lead and the dielectric separation layer form an isolation region that is substantially similar to a sensor-to-permanent-magnet-edge-isolation-region formed by the sensor and the permanent magnet separated by the gap layer, and wherein the first and second leads can be employed to conduct electrical tests that produce results that are indicative of the presence or absence of electrical isolation between the sensor and the permanent magnet in the sensor-to-permanent-magnet-edge-isolation-region.

19. The method of claim 17 further comprising forming a first electrical contact and a second electrical contact that electrically couple to the sensor such that an electrical current can flow from the first electrical contact to the second electrical contact via the sensor, and with the first electrical contact and the second electrical contact separated from the permanent magnet by a dielectric.

20. The method of claim 19 further comprising forming, on a wafer comprising the spinvalve head formed by the method of claim 19:

a first lead of a material substantially similar to a material from which the first electrical contact and the second electrical contact is formed; and a second lead of a material substantially similar to a material from which the permanent magnet is formed, the second lead being separated from the first lead by a dielectric separation layer;

wherein the first lead, the second lead and the dielectric separation layer form an isolation region that is substantially similar to electrical-contact-to-permanent-magnet-edge-isolation-regions formed by the first electrical contact and the second electrical contact separated from the permanent magnet by the dielectric, and wherein the first and second leads can be employed to conduct electrical tests that produce results that are indicative of the presence or absence of electrical isolation between the first electrical contact and the second electrical contact and the permanent magnet in the electrical-contact-to-permanent-magnet-edge-isolation-regions.

21. The method of claim 19 further comprising forming, on a wafer comprising the spinvalve head formed by the method of claim 19:

a first lead of a material substantially similar to a material from which the first electrical contact and the second electrical contact is formed; and a second lead of a material substantially similar to a material from which the permanent magnet is formed, the second lead being separated from the first lead by a dielectric separation layer;

wherein the first lead, the second lead and the dielectric separation layer form an isolation region that is substantially similar to electrical-contact-to-permanent-magnet-area-isolation-regions formed by the first electrical contact and the second electrical contact separated from the permanent magnet by the dielectric, and wherein the first and second leads can be employed to conduct electrical tests that produce results that are indicative of the presence or absence of electrical isolation between the first electrical contact and the second electrical contact and the permanent magnet in the electrical-contact-to-permanent-magnet-area-isolation-regions.

22. The method of claim 21 wherein the second lead is formed to be larger than the first lead.

23. The method of claim 19 further comprising forming, on a wafer comprising the spinvalve head formed by the method of claim 19:

a first lead of a material substantially similar to a material from which the first electrical contact and the second electrical contact is formed; and a second lead of a material substantially similar to a material from which the permanent magnet is formed, the second lead being separated from the first lead by a dielectric separation layer;

wherein the first lead, the second lead and the dielectric separation layer form an isolation region that is substantially similar to milled-electrical-contact-to-permanent-magnet-edge-isolation-regions formed by the first electrical contact and the second electrical contact separated from the permanent magnet by the dielectric, and wherein the first and second leads can be employed to conduct electrical tests that produce results that are indicative of the presence or absence of electrical isolation between the first electrical contact and the second electrical contact and the permanent magnet in the milled-electrical-contact-to-permanent-magnet-edge-isolation-regions.

24. The spin valve head of claim 23 wherein the second lead is formed to be smaller than the first lead.

25. A method of configuring a spinvalve head to allow for electrical testing of the spinvalve head, the spinvalve head adapted to operate in a current-in-plane (CIP) mode, the spinvalve head having an air bearing surface (ABS), the spinvalve head comprising a top shield and a bottom shield separated by a central region proximate the ABS, a sensor, positioned in the central region, having a proximal end and a distal end, the proximal end forming a portion of the ABS, and a permanent magnet positioned in the central region and proximate the distal end of the sensor, the permanent magnet being separated from the sensor by a gap layer, the method comprising:

forming a shield-shunt between the top shield and the bottom shield; and adjusting a dimension of the sensor such the sensor has a resistance value that allows for relatively accurate sensor-to-permanent-magnet-isolation electrical testing of the spinvalve head.

26. The method of claim 25 further comprising forming, on a wafer comprising the spinvalve head formed by the method of claim 25:

a first lead of a material substantially similar to a material from which the sensor is formed; and a second lead of a material substantially similar to a material from which the permanent magnet is formed, the second lead being separated from the first lead by a dielectric separation layer;

wherein the first lead, the second lead and the dielectric separation layer form an isolation region that is substantially similar to a sensor-to-permanent-magnet-edge-isolation-region formed by the sensor and the permanent magnet separated by the gap layer, and wherein the first and second leads can be employed to conduct electrical tests that produce results that are indicative of the presence or absence of electrical isolation between the sensor and the permanent magnet in the sensor-to-permanent-magnet-edge-isolation-region.

27. The method of claim 25 further comprising forming a first electrical contact and a second electrical contact that electrically couple to the sensor such that an electrical current can flow from the first electrical contact to the second electrical contact via the sensor, and with the first electrical contact and the second electrical contact separated from the permanent magnet by a dielectric.

28. The method of claim 27 further comprising forming, on a wafer comprising the spinvalve head formed by the method of claim 27:
   a first lead of a material substantially similar to a material from which the first electrical contact and the second electrical contact is formed; and
   a second lead of a material substantially similar to a material from which the permanent magnet is formed, the second lead being separated from the first lead by a dielectric separation layer;
   wherein the first lead, the second lead and the dielectric separation layer form an isolation region that is substantially similar to electrical-contact-to-permanent-magnet-edge-isolation-regions formed by the first electrical contact and the second electrical contact separated from the permanent magnet by the dielectric, and wherein the first and second leads can be employed to conduct electrical tests that produce results that are indicative of the presence or absence of electrical isolation between the first electrical contact and the second electrical contact and the permanent magnet in the electrical-contact-to-permanent-magnet-edge-isolation-regions.

29. The method of claim 27 further comprising forming, on a wafer comprising the spinvalve head formed by the method of claim 27:
   a first lead of a material substantially similar to a material from which the first electrical contact and the second electrical contact is formed; and
   a second lead of a material substantially similar to a material from which the permanent magnet is formed, the second lead being separated from the first lead by a dielectric separation layer;
   wherein the first lead, the second lead and the dielectric separation layer form an isolation region that is substantially similar to electrical-contact-to-permanent-magnet-area-isolation-regions formed by the first electrical contact and the second electrical contact separated from the permanent magnet by the dielectric, and wherein the first and second leads can be employed to conduct electrical tests that produce results that are indicative of the presence or absence of electrical isolation between the first electrical contact and the second electrical contact and the permanent magnet in the electrical-contact-to-permanent-magnet-area-isolation-regions.

30. The method of claim 29 wherein the second lead is formed to be larger than the first lead.

31. The method of claim 27 further comprising forming, on a wafer comprising the spinvalve head formed by the method of claim 27:
   a first lead formed of a material substantially similar to a material from which the first electrical contact and the second electrical contact is formed; and
   a second lead formed of a material substantially similar to a material from which the permanent magnet is formed, the second lead being separated from the first lead by a dielectric separation layer;
   wherein the first lead, the second lead and the dielectric separation layer form an isolation region that is substantially similar to milled-electrical-contact-to-permanent-magnet-edge-isolation-regions formed by the first electrical contact and the second electrical contact separated from the permanent magnet by the dielectric, and wherein the first and second leads can be employed to conduct electrical tests that produce results that are indicative of the presence or absence of electrical isolation between the first electrical contact and the second electrical contact and the permanent magnet in the milled-electrical-contact-to-permanent-magnet-edge-isolation-regions.

32. The spin valve head of claim 31 wherein the second lead is formed to be smaller than the first lead.

* * * * *